W. H. O'BEIRNE.
DUMPING WAGON.
APPLICATION FILED MAR. 2, 1917.

1,261,955.

Patented Apr. 9, 1918.
3 SHEETS—SHEET 1.

Witness
Philip E. Barnes

Inventor
Wm. H. O'Beirne
By Meyers Cushman & Rea
Attorney

W. H. O'BEIRNE.
DUMPING WAGON.
APPLICATION FILED MAR. 2, 1917.

1,261,955.

Patented Apr. 9, 1918.
3 SHEETS—SHEET 2.

W. H. O'BEIRNE.
DUMPING WAGON.
APPLICATION FILED MAR. 2, 1917.

1,261,955.

Patented Apr. 9, 1918.
3 SHEETS—SHEET 3.

Witness
Philip E. Barnes

Inventor
Wm. H. O'Beirne
By Meyers, Cushman & Rea
Attorney

UNITED STATES PATENT OFFICE.

WILLIAM H. O'BEIRNE, OF WOOD DALE, ILLINOIS.

DUMPING-WAGON.

1,261,955. Specification of Letters Patent. Patented Apr. 9, 1918.

Application filed March 2, 1917. Serial No. 152,140.

*To all whom it may concern:*

Be it known that I, WILLIAM H. O'BEIRNE, a citizen of the United States, residing at Wood Dale, in the county of Du-page and State of Illinois, have invented new and useful Improvements in Dumping-Wagons, of which the following is a specification.

My invention relates to dumping wagons or carts, and has particular reference to wagons adapted for use in transporting garbage and like offensive matter, although my improved wagon is equally applicable for the transportation of solid materials such as ores, coal, dirt and the like.

This invention has as its objects to provide a cart or wagon which has a large carrying capacity, but which occupies a minimum amount of space; to provide a cart which may be easily loaded and which may be quickly emptied; to provide a cart which may be readily transported with a minimum amount of power; and to provide a dumping cart which while relatively simple in structure and light in weight is sufficiently strong to withstand the strains and wear to which it is subjected when in use.

The above and other objects of this invention are obtained in the structure described in the following specification and illustrated in the accompanying drawings wherein—

Figure 4:
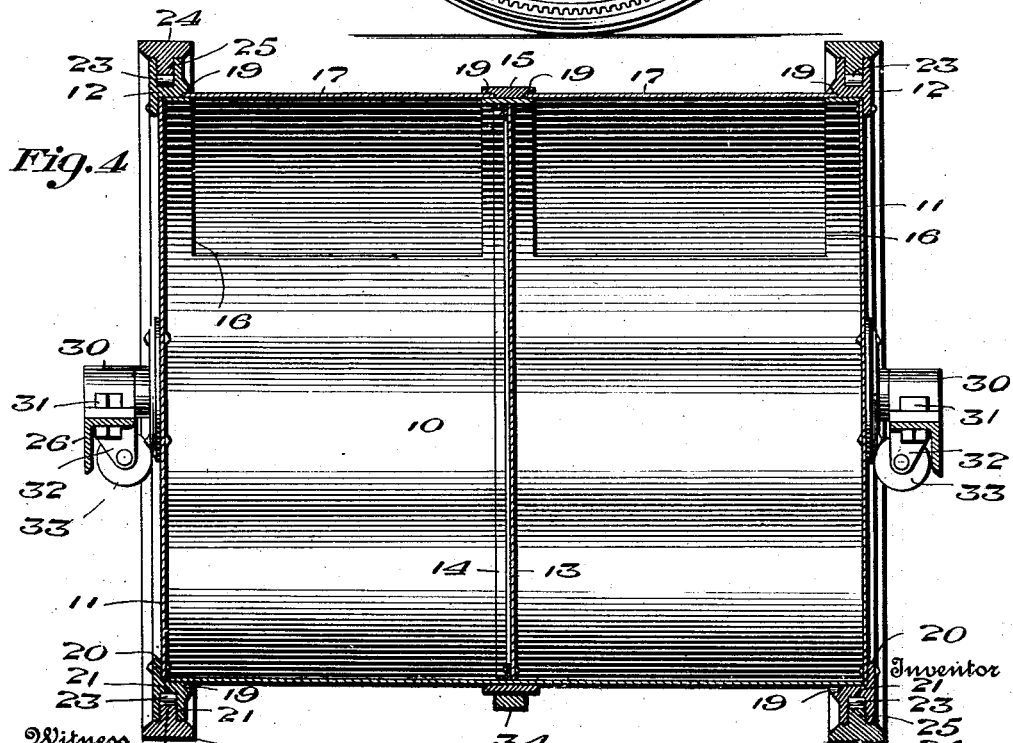

Fig. 4 is a sectional view on a vertical plane passing through the axis of the revoluble body or container.

Figure 5:
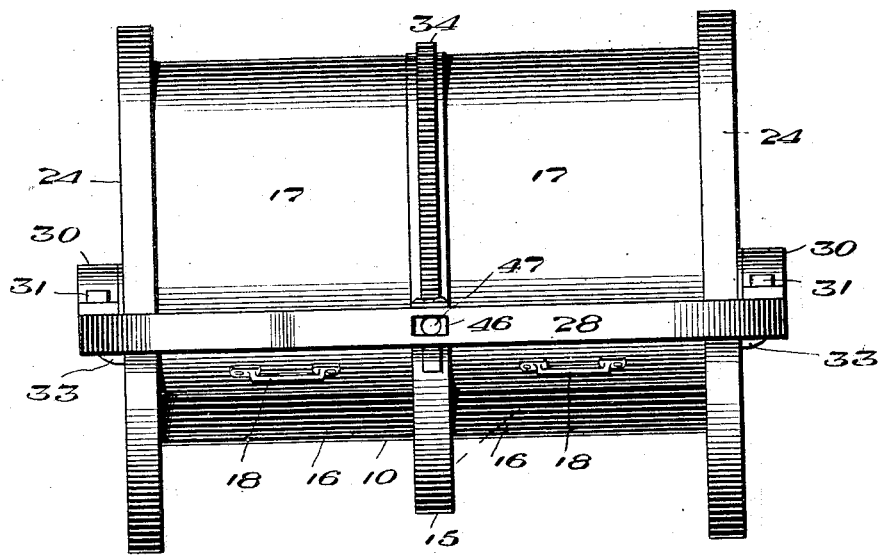

Fig. 5 is a rear sectional view of the device showing the container in dumping position.

Figure 6:
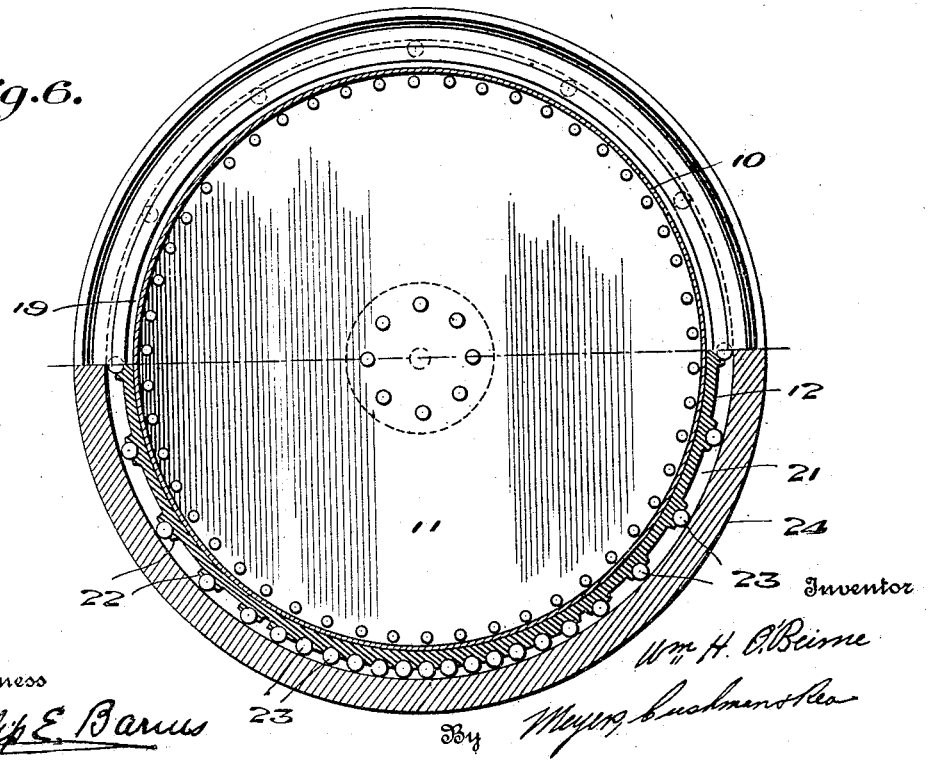

Fig. 6 is a sectional view through the container taken at right angles to the axis thereof and showing one of the annular truck members partly in section.

Referring to the drawings wherein like numerals represent like parts in the several views, 10 designates a dumping or revoluble body which comprises a cylindrical container preferably constructed of sheet metal, so that it has the requisite strength combined with suitable lightness. The ends 11 of the container are secured in place by means of track members 12, hereinafter described. The cylindrical container, as shown in Fig. 4 of the drawings, is divided into two sections by a sheet metal partition 13 riveted to an angle iron ring 14 secured to the inner periphery of the container. It is to be understood that the body or container of the vehicle may be used as a single unit or separated into as many compartments as desired. Surrounding the container, preferably adjacent the internal partition 13, is a circumferential metal band 15 which serves to reinforce the container.
Each of the compartments of the body or container is provided in its cylindrical wall with an opening 16 through which the container is loaded and dumped, and these openings are closed by sliding doors 17 having handles 18. The doors are adapted to slide in grooveways 19 provided in the opposing faces of the track member 12 and the band 15.

Each of the track members 12 comprises an annular ring having an inwardly projecting flange 20, so as to provide an annular groove in which the corners of the container are adapted to engage. The ends 11 of the container are riveted or otherwise secured to the flange 20. Each of the track members 12 is provided on its outer circumference with a channel 21, which channel has spaced-apart projections 22 for maintaining roller bearings 23 in suitable spaced relation.

24 designates tread members or tires which are adapted to encircle the track members 12 in the manner shown, these bands having centrally disposed inwardly projecting flanges 25 which engage within the channel 21 of the track members 12. The inner circumference of the flanges bear against the roller bearings 23 so that friction between the parts is reduced to a minimum.

It will be noted from Fig. 6 that the greatest number of bearing members 23 are disposed within the channel 21 at the lowermost point of the track members, that is, where the greatest strain is exerted. By this arrangement the weight of the device, including the matter with which it may be loaded, is distributed on a relatively large number of bearings, while the track members and tread members are held in suitable relation to each other without any great amount of friction by those bearings which are distributed about the sides and the top of the track members.

The container is provided with a main frame which may be of any suitable construction, that shown in the drawings being disclosed, by way of illustration, as formed of angle irons, the draft frame comprises side sills 26, and end sills 27 and 28.

Secured to the centers of ends 11 of the container or body 10 are suitable trunnions 29 which project into suitable bearing members 30 secured by means of bolts 31 to the side sills 26 of the main frame.

As is clearly shown in Fig. 4, mounted in suitable brackets 32, secured to the underside of the side sills 26 near the circumference of the container, are rollers 33 which are adapted to bear against the track members 12. By this construction, the trunnions 29 and the ends 11 of the container are relieved of strains to which they would otherwise be subjected when the device is passing over uneven ground.

When it is desired to dump the load from the container 10, the container is rotated so as to bring the openings 16 to the underside of the container. The means for so rotating or dumping the body comprises a semi-circular rack member 34 secured in any suitable manner to the metal band 15, and this rack member is in mesh with a gear wheel 35 mounted upon one end of transverse shaft 36. Mounted upon the opposite end of the shaft 36 is a smaller gear 37 meshing with a large gear 38 fixed to a shaft 39. Both of the shafts 36 and 39 are mounted in suitable bearings in a supporting frame 40 secured to the front sills of the draft frame. Also fixed upon the shaft 39 is a ratchet gear 41, and this gear is adapted to be rotated by means of a hand-lever 42 having any approved form of ratchet mechanism adapted to be detachably connected to the ratchet gear 41 when it is adapted to rotate the container. A foot-operated pawl 43 is pivoted to the main frame and is normally held in engagement with the teeth of the gear 38 by a spring 43′ so as to maintain the dumping mechanism normally inoperative.

Figure 1:
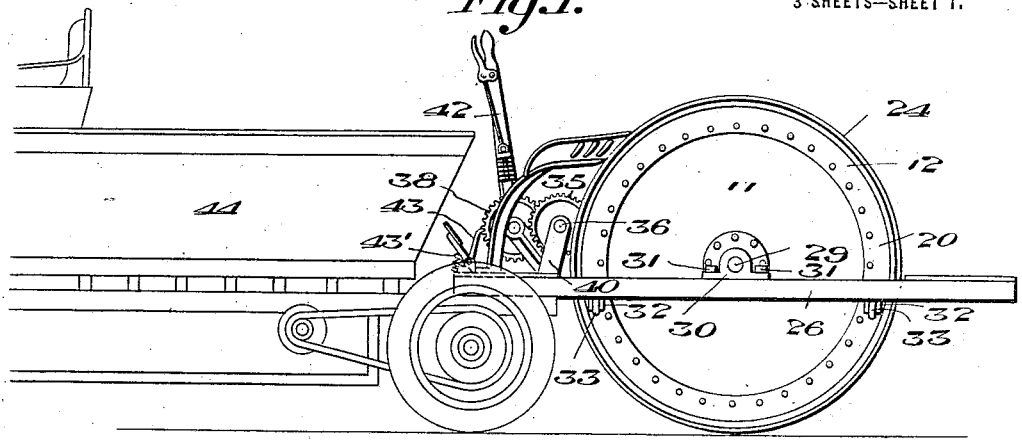
Figure 1 is a side elevational view of my improved device, the same being shown as attached to a tractor of any well-known type.
Figure 2:
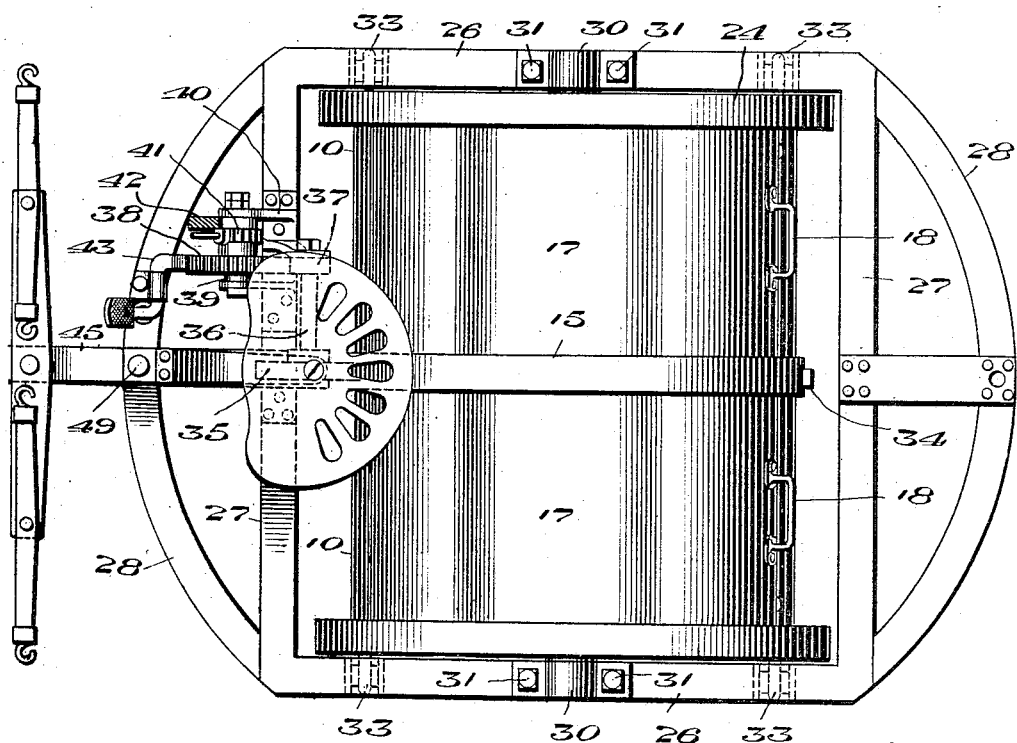
Fig. 2 is a top plan view of my improved dumping cart equipped with a tongue or shaft to permit the same to be drawn by means of horses.
Figure 3:
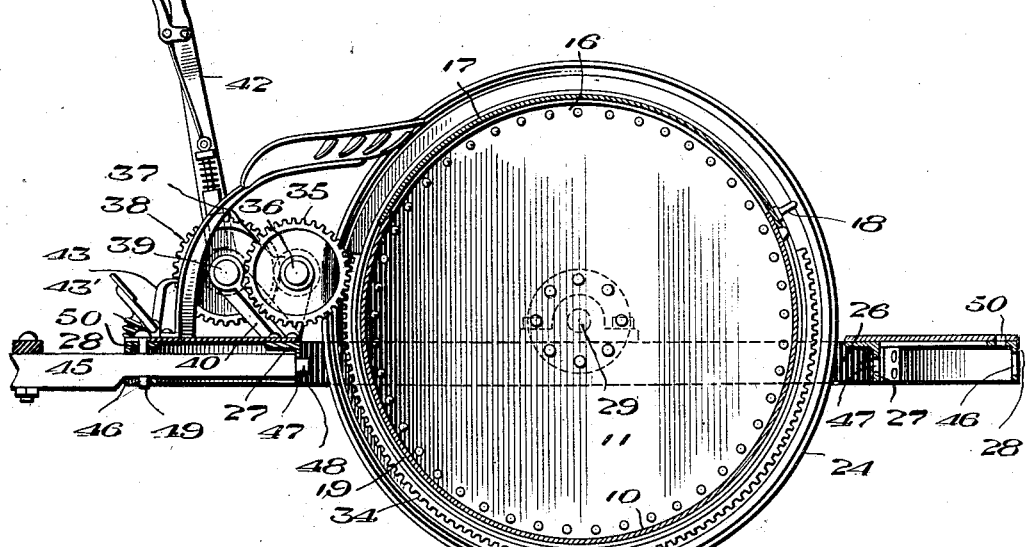
Fig. 3 is a vertical sectional view taken on a line passing substantially through the longitudinal center of the wagon shown in Fig. 2.

In Fig. 1, I have shown my improved cart attached to a motor tractor 44 which tractor may be of any well-known type. However, my improved device may be drawn by horses hitched to a detachable tongue 45 shown in Figs. 2 and 3. Each of the outer transverse sills 28 at opposite ends of the main frame is provided in its vertical web or flange with a rectangular opening 46, and each of the inner transverse sills 27 is provided with a smaller round opening 47.

The tongue 45 is rectangular in cross-section and engages in opening 46 and has a rounded projection 48 which extends into the opening 47. The tongue is held against removal by means of a bolt 49 which passes through a hole 50 in the transverse sill 28. When it is desired to attach the cart to a tractor, the tongue may be easily removed from the device by withdrawing the bolt 49. The cart is then secured to the tractor by inserting the bolt 49 through the opening 50 in one of the end sills and into a suitable socket formed in the frame of the tractor.

It will be noted that each end of the frame is provided with openings 46, 47 and 50 so that the tongue or tractor may be secured to either end of the cart, and the latter may be drawn in each direction. The main advantage, however, in providing each end of the main frame with an opening 50 is that a number of carts may be secured together, end to end, so as to form a whole train of carts adapted to be drawn by one tractor.

The mode of operation of my device will be readily understood. Assuming the container 10 to be empty, and that it is desired to load the same with garbage or other material, the sliding door or doors 17 are pushed from over the openings 16 and the container or body is slightly rotated toward the dumping position to facilitate easy loading. As the load increases, the container is rotated in a direction to bring the openings 16 to their highest level. After the load has been completed the doors 17 are closed. Of course, the doors may be opened and closed at will during the loading operation, regardless of the position of the container, to prevent the escape of obnoxious fumes which may arise from the garbage.

During the process of loading the cart, it is preferably drawn by horses as frequent stops are necessary, and the load to be transported is not excessive. After loading the cart, it is drawn by the horses to a point where carts from various collecting districts are gathered. The tongues are then removed, and the carts connected end to end in a train and conveyed by a motor vehicle to the garbage reduction plant, or other place of disposal which may be located some distance from the city. Upon reaching the place for disposal, the operator will first open the doors 17 and then operate the lever 42 back and forth. By means of the gearing mechanism above described and the rack member 34, the container is rotated into the full dumping position shown in Fig. 5. After dumping, the container, the lever 42 is operated to rotate the container in the opposite direction, the foot-operated plunger 43 first being disengaged from the gear 38.

When transporting the device from place to place, the tires or tread members 24 will engage the ground and revolve. The spring-pressed pawl 43 maintains the gears 35, 37 and 38 stationary, and due to the engagement of gear 35 with the rack member 34, the container is held against rotation. The roller bearings 23 reduce friction between the track members 12 and the tires 24 to a minimum, and as heretofore stated, the bearings are so distributed that a large number of them sustain the weight of the container together with its load.

It will be noted that the tread members 24 surround the cylindrical body or container 10. By this construction, the body is subjected to but little strain. The body 10 is not suspended from an axle mounted on wheels located outside of the plane of the body as is usually the case, but, on the other hand, the main frame is supported by the body.

It is, of course, obvious that my invention is susceptible of various modifications and changes which would be within the spirit of my invention without departing from the scope of the following claims.

What I claim is:—

1. In a device of the class described, a revoluble cylindrical body, a track member about said body and comprising a ring having a circumferential channel, a tread member about said track member and having a circumferential flange engaging in said channel, projections in said channel, and bearings mounted between such projections and interposed between said tread and track members.

2. In a device of the class described, a revoluble container, a frame supported by and fulcrumed upon said container, track members about said container, tread members about said track members, and means for normally maintaining the container against rotation.

3. In a device of the class described, a container comprising a cylindrical body portion and ends, said body portion having openings to permit dumping of the container, a track member adjacent each end of said container and having an inwardly projecting flange to which an end of said container is secured, a band about said body and doors for said openings, the opposing edges of said track members and band having slots forming guideways in which said doors slide.

4. In a device of the class described, a container, annular track members fixed to and surrounding the body portion of said container, tread members about said track members, bearing members interposed between said track and tread members, and projections carried by track members for maintaining said bearings in suitable spaced apart relation, the greater number of said bearings being disposed at the lowermost point of said track members.

5. In a device of the class described, a cylindrical container having trunnions at its opposite ends, a frame fulcrumed on said trunnions and supported by said container, track members about the ends of said container and each comprising an annular ring having an inwardly projecting flange providing an annular groove for the reception of the corners of the container and also having a channel in its outer periphery, means for securing both the cylindrical walls and the ends of the container to said track members, and tread members about said track members and having flanges engaging in said channels.

In testimony whereof I have hereunto set my hand in presence of two subscribing witnesses.

WILLIAM H. O'BEIRNE.

Witnesses:
SEYMOUR STANDISH,
FLORENCE OLSON.